United States Patent [19]

Norris

[11] Patent Number: 4,800,551
[45] Date of Patent: Jan. 24, 1989

[54] METHOD AND APPARATUS FOR FEEDING CARD

[75] Inventor: Philip R. Norris, Reading, Mass.

[73] Assignee: Polaroid Corporation, Cambridge, Mass.

[21] Appl. No.: 50,039

[22] Filed: May 15, 1987

[51] Int. Cl.⁴ .................. G11B 17/04; G11B 25/04
[52] U.S. Cl. .................. 369/77.1; 360/2; 369/191; 369/271; 369/280
[58] Field of Search .......... 369/75.2, 77.1, 77.2, 369/244, 257, 270, 271, 292, 280, 194, 191, 202, 204; 360/2

[56] References Cited

U.S. PATENT DOCUMENTS

| | | | |
|---|---|---|---|
| 3,422,252 | 1/1969 | Cooper | 360/2 |
| 3,432,168 | 3/1969 | Kingsbury | 369/280 |
| 3,501,586 | 3/1970 | Russell | 178/6.7 |
| 3,594,735 | 7/1971 | Furlong et al. | 340/173 |
| 3,648,385 | 3/1972 | Barlow | 369/194 |
| 3,787,636 | 1/1974 | Brandt et al. | 179/100.2 |
| 4,090,031 | 5/1978 | Russell | 358/130 |
| 4,170,348 | 10/1979 | Hoeink et al. | 271/240 |
| 4,208,682 | 6/1980 | Bryer | 360/99 |
| 4,376,293 | 5/1983 | Teramura | 360/71 |
| 4,500,777 | 2/1985 | Drexler | 235/487 |
| 4,628,498 | 12/1986 | Takamatsu | 369/77.1 |
| 4,680,748 | 7/1987 | Kobayashi | 369/77.1 |
| 4,682,320 | 7/1987 | d'Alayer | 369/77.1 |
| 4,723,185 | 2/1988 | Maeda | 369/77.2 |

FOREIGN PATENT DOCUMENTS 61-190721 8/1986 Japan .................. 7/007

OTHER PUBLICATIONS

EPA Publication No. 230,069, 7/87, Patent Coopertion Treaty Publication No. WO 86/05620.

Primary Examiner—Steven L. Stephan
Attorney, Agent, or Firm—Leslie J. Payne

[57] ABSTRACT

There is disclosed an improved method of and apparatus for transporting an optical recording card along a predetermined path to a rotational reference axis whereat the card is rotated about so that concentric and/or spiral data tracks can be read by the optical reader.

42 Claims, 12 Drawing Sheets

METHOD AND APPARATUS FOR FEEDING CARD

BACKGROUND OF THE INVENTION

The present invention relates to an improved method of and apparatus for transferring a card having information recording material thereon along a path to a rotational reference axis about which the card is held and rotated, whereby the recording material can be read and/or written on by a suitable reader and/or writer device.

Various forms of record cards, such as medical record, banking and the like, which have the capacity to store significant amounts of data in binary coded form, have been proposed. For use therewith a variety of storage media are used, for example, magnetic media, photosensitive media, integrated circuit chips and optical recording media. Of course, a variety of reading and/or writing devices for interfacing with such record media have been proposed as well.

One known card has information stored on laser recording media and such card is described generally in U.S. Pat. No. 4,500,777. Essentially, the information to be stored is converted to digital code and written as a series of micron-size pits and spaces. These pits and spaces are recorded in generally linear tracks. A reader and/or writer device for use therewith must, therefore, perform rectilinear scanning movement with respect to these data tracks. While such an optical card reader and/or writer device serves satisfactorily, it nonetheless tends to be somewhat complicated in construction and operation.

Another kind of optical record is described in U.S. Pat. No. 3,501,586 wherein data is recorded onto data tracks which are segmented into arcs or raster lines across the card. Such cards may be read by a playback system, such as illustrated in U.S. Pat. No. 4,090,031, wherein the card is held stationary and each track segment can be read by a corresponding set of scanning elements. While such optical card reader and/or writer devices serve satisfactorily, they nonetheless tend to be somewhat complicated in construction and operation.

SUMMARY OF THE INVENTION

In accordance with the principles of the present invention, there is provided an improved method of an apparatus for transferring a generally rectangular card, having binary coded information stored on concentric and/or spiral tracks, to a rotational reference axis where the card can be rotated thereabout.

Included in the apparatus is a housing assembly which may house a card reader and/or writer device. Disposed in the housing assembly are means for transferring the card from a housing assembly opening, in a first direction, to the rotational reference axis. Means are provided for positioning the card at the reference axis and for allowing rotation of the card about the reference axis, whereby the tracks can be read and/or written by the reader and/or writer device.

In an illustrated embodiment, the reader and/or writer device is operable for rotating the card about the rotational reference axis. Provision is made for means for holding and positioning the plane of the card in a substantially orthogonal relationship to the rotational reference axis and for allowing rotation of the card about the axis, whereby the tracks can be read and/or written on.

In another illustrated embodiment, the transferring means includes, means for sensing the presence of a card along a predetermined path and in response thereto for generating a signal indicative of the presence of the card. For advancing the card in the first direction, a card driving means is provided which is responsive to the signal for driving the card along the predetermined path.

In another illustrated embodiment, the positioning means comprises a rotatable card receptacle which is orientable in a preferred rotational position, along the path for purposes of removably receiving the card therein. The card receptacle is constructed so that the card carried therein can be rotated therewith by the reader and/or writer device.

In another illustrated embodiment, the card driving means facilitates orientation of the card receptacle and the card carried therein to the preferred position. In such an embodiment the card receptacle includes means for orienting and latching the receptacle in the preferred position.

In other illustrated embodiments, as the card receptacle is raised from a position allowing card rotation, the card encounters means for stopping card rotation and orienting it with a card recess in the card receptacle so as to be in the preferred position.

This invention relates to a method whereby the card travels to the reference axis about which the card is rotated. In one embodiment of the method, a card reader and/or writer device is operable for rotating the card about the reference axis. In another embodiment of the method, the plane of the rotating card is held in a substantially orthogonal relationship to the reference axis. In another embodiment of the method, the card is oriented to a preferred position following card rotation, so that it can be discharged.

Among other objects of this invention are, therefore, the provision of a method of and apparatus which can easily be adapted to commercially available compact disc players; the provision of an apparatus which is portable, inexpensive and reliable; and, the provision of an apparatus in which there are no operator steps necessary other than merely inserting the card into the apparatus.

These and other objects, features and the invention itself will become apparent from the following description when taken in conjunction with the accompanying drawings wherein like structure throughout the several views are indicated by like reference numerals.

DETAILED DESCRIPTION

Figure 1:
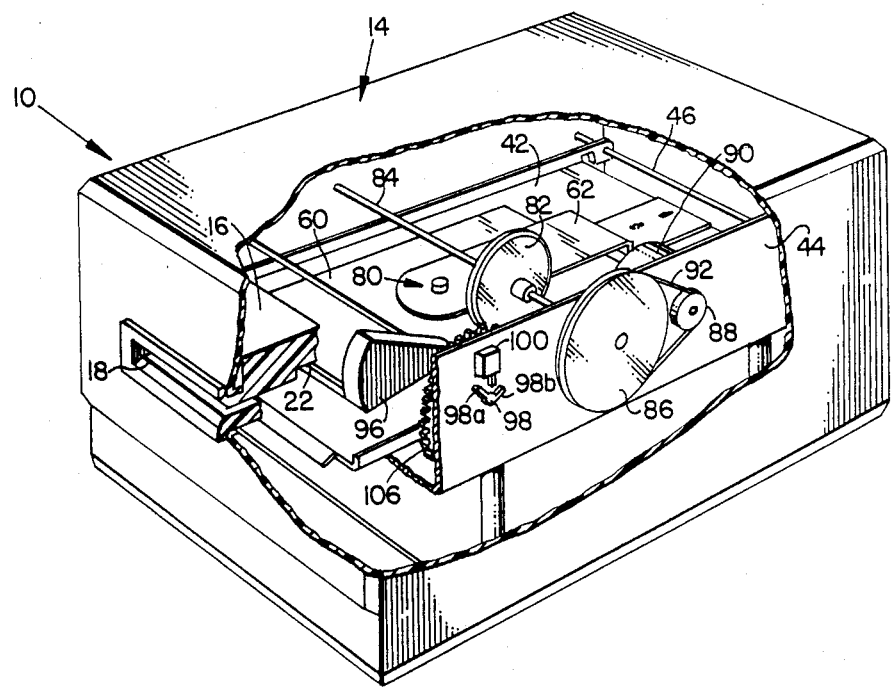
FIG. 1 is a perspective view of an optical reader apparatus made in accordance with the principles of the present invention with portions thereof broken away to depict certain components of a preferred embodiment of such apparatus.

Reference is made to FIGS. 1-7 and 9 for showing a preferred embodiment of an optical card reader apparatus 10 made in accordance with the principles of this invention. It is for use in conjunction with an optical record card 12, such as shown in FIG. 8. The card 12 can, preferably, have a rectangular shape and wallet-sized dimensions. The optical card 12 has formed thereon a circular band 12a of optically encoded and/or writable media. Binary coded digital information can be encoded thereon in substantially concentric and/or spiral tracks (not shown) since the card 12 will be spun in a manner which will be described. In this embodiment, the band 12a is made of an optical encoded medium that is used for manufacturing optical compact discs. Accordingly, it can be read by known compact disc player apparatus.

With reference to FIGS. 1-4, the card reader 10 is seen to include a portable housing assembly 14 made of plastic or other suitable lightweight materials. Connected to the interior of the housing assembly 14 is a guide block 16 which has a portion thereof extending outwardly and defining a card slot 18 that allows entry and exit of the optical card 12 therethrough.

Figure 2:
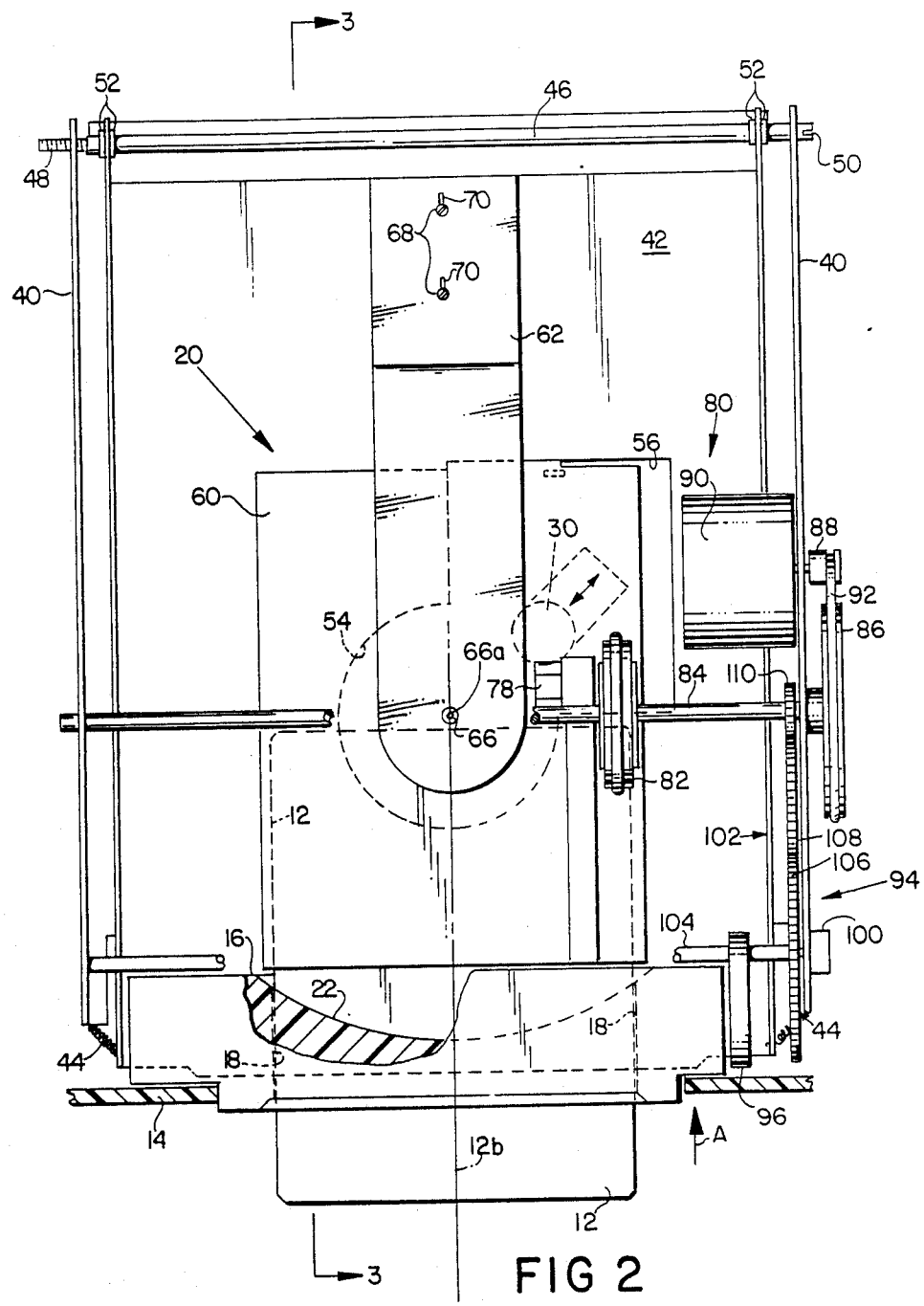
FIG. 2 is a plan view of certain structure forming the preferred embodiment.

As illustrated in FIG. 2, the walls defining the slot 18 are shaped and dimensioned to slidingly engage longitudinal edges of the optical card 12. This allows a longitudinal axis 12b (FIG. 2) of the card 12 to travel substantially parallel to a linear path, indicated by arrow A, into proper alignment with a card positioning means 20. The card slot 18 communicates with a circular segment portion 22 of the guide block 16. This portion 22 allows rotation of card positioning means 20. The guide block 16 defines means which allows advancement of the optical card 12 such that the longitudinal axis 12b of the latter is parallel to the path and can easily be aligned with the rotational reference axis 24 (FIGS. 3-5) for purposes of properly positioning the tracks for reading and/or writing.

The housing assembly 14 encompasses the major components of an optical compact disc player, diagrammatically shown at 26 (FIG. 5), of a type commercially available. The present invention is adapted easily to relatively inexpensive and highly reliable compact disc players. Thus, the optical card reader apparatus 10 can read wallet type cards and be made inexpensively, but still possess a high degree of operational reliability. In the present embodiment, the compact disc player 26 is a model CDM2 commercially available from Magnavox Corporation in the United States. For the sake of clarity in describing and understanding this invention, only those details of the structure and operation of the player 26 which are deemed necessary will be set forth.

Figure 3:
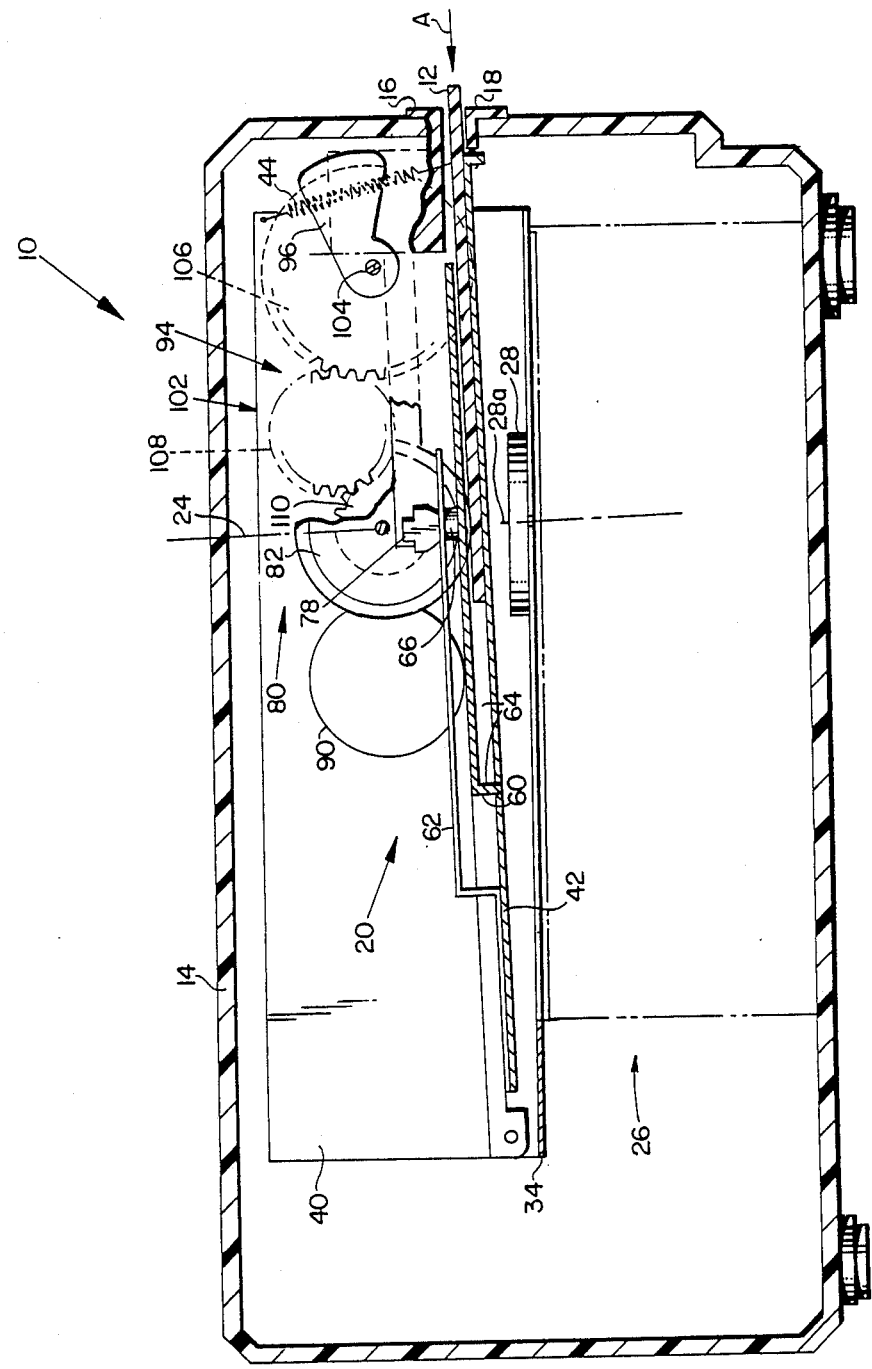
FIG. 3 is a cross-sectional view taken along the section lines 3—3 in FIG. 2 and looking in the direction of the arrows.
Figure 4:
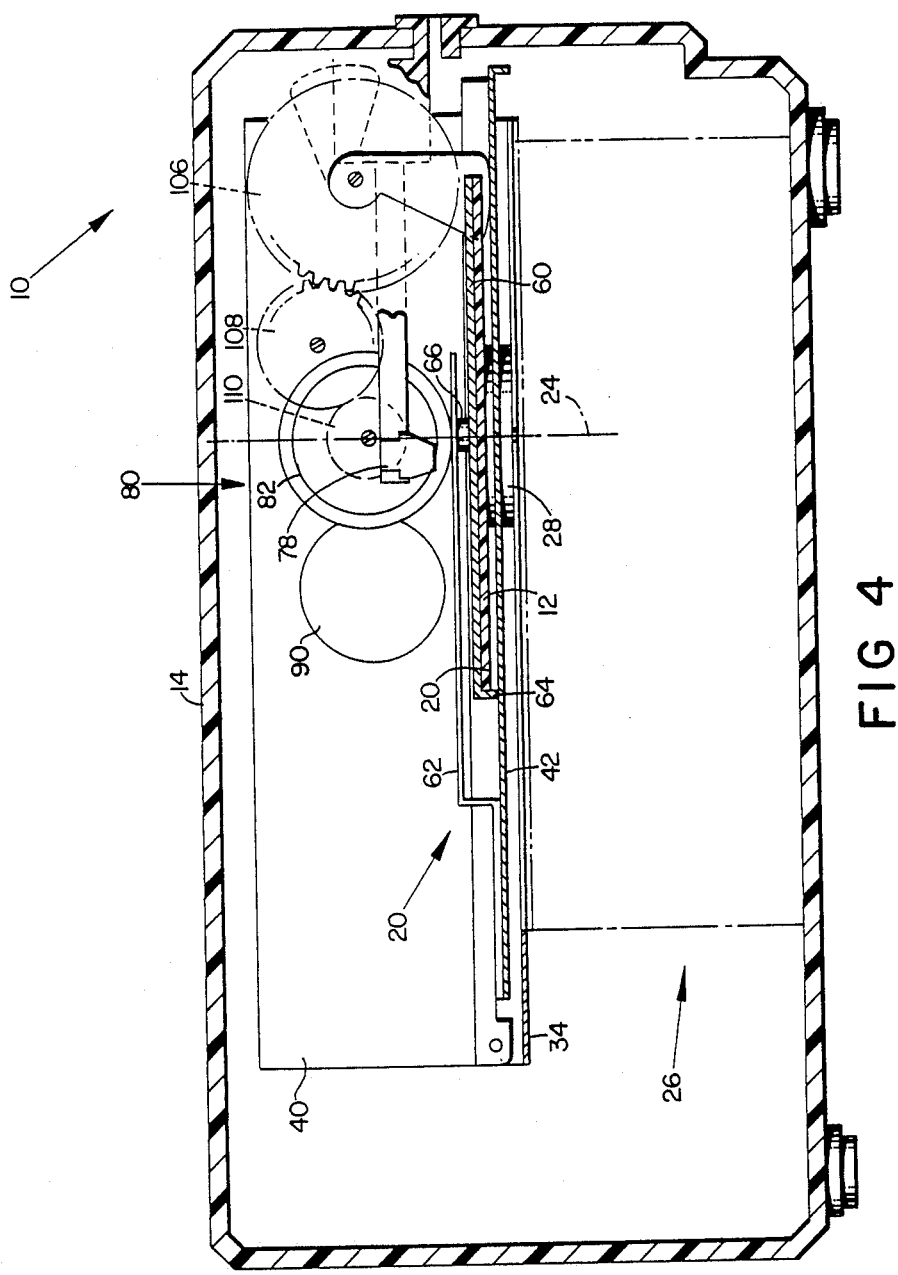
FIG. 4 is a view similar to FIG. 3, but showing the components thereof in a different operative relationship.
Figures 5, 5A:
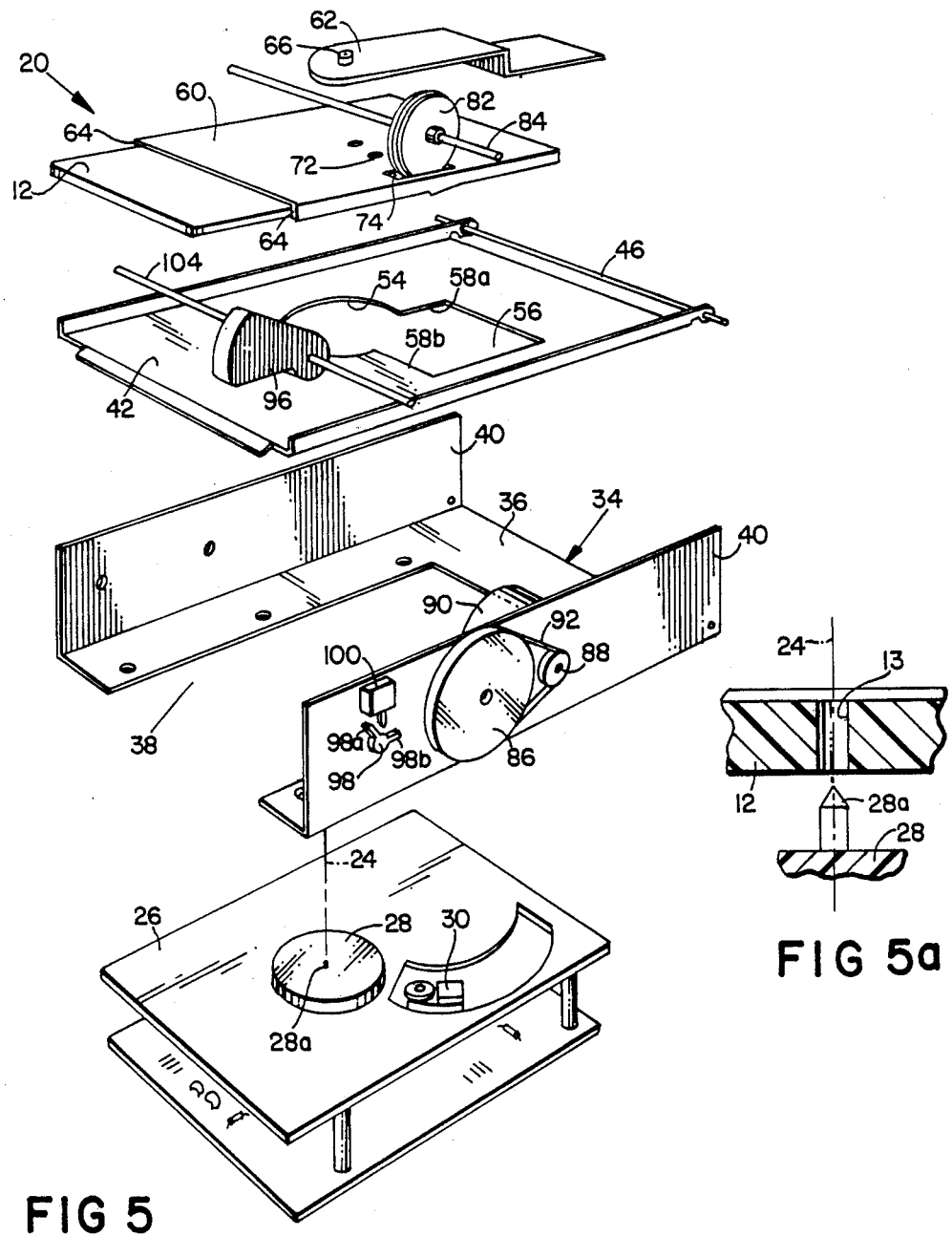
FIG. 5 is an exploded perspective view of certain of the components shown in FIGS. 3 and 4.
FIG. 5A is an enlarged and fragmented view, partially in cross-section, showing a card centering post on a drive spindle aligned with a hole in the optical card.
Figure 6:
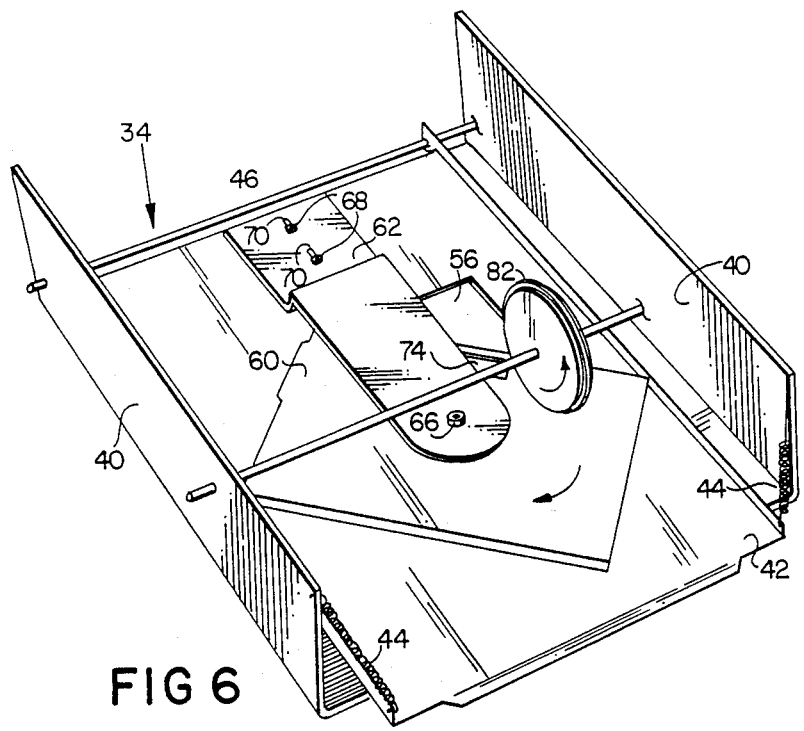
FIG. 6 is a perspective view of the preferred embodiment with some detail omitted to show more clearly a card orienting operation.

As illustrated in FIGS. 3-5, a spindle 28 of the player 26 is adapted to rotate about the rotational reference axis 24. As will be explained, the optical card 12 engages the spindle 28 so as to be rotated about the rotational reference axis 24. The compact disc player 26 also includes an optical reading head assembly 30 (FIG. 5) which reads the annular data tracks on the card 12 just as it would read the tracks on a compact disc. The optical head asembly 30 moves in a generally radial path relative to the tracks as the latter are being spun about the rotational reference axis 24.

As shown in FIG. 5, an adapter plate 34 is attached to the compact disc player 26. The adapter plate 34 has a generally U-shaped cross-section with a bottom wall 36 formed with a generally rectangular cutout 38 and a pair of spaced apart and generally parallel upstanding sidewalls 40. The cutout 38 facilitates operative communication between the spindle 28, the optical head assembly 30 and the card 12. The bottom wall 36 is attached to the compact disc player 26 by a plurality of threaded members (not shown).

With reference to FIGS. 1-4, the card positioning means 20 is situated immediately adjacent the guide block 16 and is mounted pivotally to the sidewalls 40 for up and down movement between a card holding position (FIGS. 2 and 3) and card rotating or spinning position (FIG. 4). Included in the positioning means 20 is a generally rectangular and flat card support member 42. The card support member 42 is normally biased upwardly to the card holding position by a pair of springs 44 (FIGS. 2, 4 and 6), each one of which is connected between a sidewall 40 and a corresponding side of the card support member 42.

With continued reference to FIG. 2, there is provided an elongated, rotatable and adjustable pivot rod 46 to which the card support member 42 is attached for pivoting movement thereabout. one end of the pivot rod 46 has a threaded portion 48 which is threadly connected to internal threads formed in one of the sidewalls 40. The other end of the pivot rod 46 is provided with a slot 50. Respective pairs of bowed E-rings 52 support the pivot rod 46 for relative axial and rotational movement with respect to the adapter plate 34. Rotation of the pivot rod 46 is effected by a tool inserted into slot 50. This allows the rod 46 to be axially displaced and thereby correspondingly displace the card support member 42 for adjusting the latter with respect to the rotational reference axis 24 in a manner which will be described.

As best depicted in FIG. 5, the card support member 42 includes a generally circular cutout segment 54 contiguous to a generally quadrilateral cutout segment 56. The circuit cutout segment 54 allows the spindle 28 to drivingly engage the optical card 12 whenever the card support member 42 is urged to the card rotating position (FIG. 4). The quadrilateral cutout segment 46 allows the optical head assembly 30 to operatively cooperate with the tracks of the optical card 12. The edges 58a and 58b of the segment 56 are formed for providing detent engaging surfaces which function in a manner to be described.

The positioning means 20 also includes rectangular card receptacle 60 and a leaf spring 62. The card receptacle 60 is shaped and dimensioned to slidably receive therein the optical card 12. Internal surfaces 64 (FIGS. 3, 4, and 7) of the card receptacle 60 serve to virtually center the tracks with respect to the rotational reference axis 24. The card support member 42, under the influence of the springs 44, supports the card 12 in the receptacle 60 as well as the card moving into and out of the receptacle. As shown in FIG. 5A, the spindle 28 is provided with a centering post 28a which is adapted to engage an opening 13 formed in the card 12. Such cooperation serves to substantially precisely position the center of the annular tracks to the rotational reference axis 24. The card receptacle 60 is adapted to be rotated about a rotational journal 66 having an opening therethrough 66a (FIG. 2) and which fits into an opening 67 (FIG. 7) in the receptacle. The journal 66 connects the card receptacle 60 to a portion of the distal end of the leaf spring 62. The opposite end of the leaf spring 62 is mounted on the card support member 42 by threaded members 68 (FIGS. 2 and 6) which fit through respective elongated slots 70. The leaf spring 62 is inherently biased to urge the card receptacle 60 downwardly, whereby the optical card 12 can tightly engage the spindle 28 and be rotated therewith. It will be noted that the longitudinal axis and plane of the card are substantially orthogonal to the reference axis 24, see FIG. 4. Because of the slots 70, it will be understood that the receptacle 60, the leaf spring 62, and the journal 66 can be moved linearly so as to facilitate adjusting the rotational axis of the receptacle and thereby the card 12 to the rotational reference axis 24.

Because of the adjustable pivot rod 46 and the slots 70, the card receptacle 60 and thereby the card 12 are movable along x and y axes in the plane of the card support member 42. This facilitates proper alignment of a rotational axis of the receptacle 60 and card to the rotational reference axis 24. To perform this centering, an operator need merely insert an aligning rod (not shown) into the opening 66a in the journal 66 and into engagement with centering post 28a on the spindle 28. Alternatively, the spindle 28 could be provided with a centering hole for the aligning rod. By suitable manipulation of the pivot rod 46 and/or the threaded members 68 in slots 70, the card receptacle 60 and the card 12 can be precisely positioned relative to the rotational reference axis 24. The foregoing adjustment features provide means for insuring proper centering of the rotational axis of the receptacle 60 and card with the rotational reference axis 24.

Figure 7:
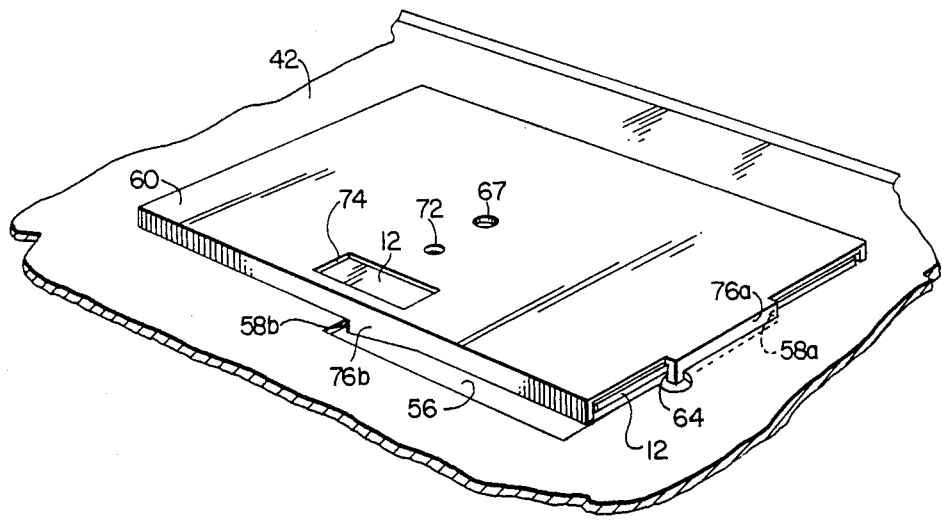
FIG. 7 is an enlarged perspective view of portions of a card receptacle forming the preferred embodiment.
Figure 8:
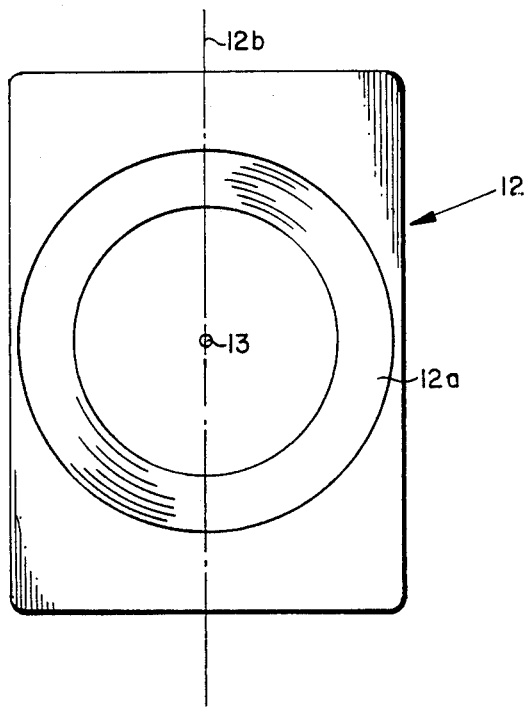
FIG. 8 is a plan view of an optical card for use in conjunction with the present invention.

Still referring to the card receptacle 60, and in particular to FIG. 7, it is seen that it includes a photodetector opening 72, a card drive opening 74, and a pair of depending detents 76a, b.

The photodetector opening 72 allows a photodetector assembly 78 (FIGS. 2-4) to detect the presence of the optical card 12 in the card receptacle 60. An output signal is generated by the photodetector assembly 78 when it senses the presence of the card 12 in the receptacle 60. Such signal is effective, as will be explained, to initiate operation of the a card driving means or mechanism indicated generally by reference numeral 80. The photodetector assembly 78 is connected to a support arm extending from the guide block 16. The photodetector assembly 78, in this embodiment, is a reflective object sensor having an emitter and receiver in the same unit. For example, the photodetector 78 can be type OPB703A sold by the TRW Company in the United States.

The card drive opening 74 is rectangular and allows the card driving means 80, when operating, to engage a top surface of the optical card 12 to drive the latter completely into the receptacle 60 or to discharge the card therefrom. The depending detent 76a has a shoulder which engages cooperatively the edge 58a. The depending detent 76b has a shoulder which cooperatively engages the edge 58b. The edges 58a, 58b are at right angles to each other. The detents and the edges are arranged relative to each other for providing means for orienting and latching the card receptacle 60 in the noted preferred position, as seen in FIG. 2. The card receptacle 60 cannot rotate in either direction until the card support member 42 is urged downwardly to the position depicted in FIG. 4, thereby freeing the detents from the respective edges.

Reference is now made back to the card driving mechanism 80. In this embodiment, it includes a drive wheel 82 fixedly mounted on a shaft 84 that is rotatably connected to and between the sidewalls 40. The drive wheel 82, with its elastomeric periphery, is positioned to drivingly engage the optical card 12 and the card receptacle 60. As shown in FIG. 2, a large diametered driven pulley 86 is mounted on one end of the shaft 84. A small diametered drive pulley 88 is mounted on an end of a drive shaft of an electric motor 90. The electric motor 90 is mounted to an interior side of one sidewall 40. An endless drive belt 92 is wrapped around both pulleys 86 and 88 so that the motor 90 can drive the drive wheel 82. The electric motor 90 is reversible and can drive the drive wheel 82 in opposite directions so that the optical card 12 can be driven into or out of the card receptacle 60.

A camming mechanism 94 (FIGS. 2-4) is selectively operable so that in one condition of operation it moves the card support member 42 to the down position (FIG. 4) and in another condition of operation allows the springs 44 to move the card support member 42 to the up position (FIG. 3). This camming mechanism 94 includes a cam member 96, a switch actuator 98 having arms 98a and 98b (FIG. 1) for selectively actuating a double pole-double throw switch 100 and a gear mechanism 102 (FIG. 2). The gear mechanism 102 is effective to transfer power from the electric motor 90 to the cam member 96 so as to rotatably displace the latter.

The cam member 96 and the switch actuator 98 have the shape and dimensions shown in the drawings. Both are fixed to a rotatable shaft 104 which is rotatably connected to and between the sidewalls 40.

Fixedly mounted on the shaft 104 is a driven gear 106 which meshes with an idler gear 108 mounted for rotation on an idler shaft attached to one of the sidewalls 40. The idler gear 108 in turn meshes with the driving gear 110 which is fixedly mounted on the shaft 84. Therefore, rotation of the shaft 84 results in rotation of the cam member 96 and the switch actuator 98. The former will selectively engage the card support member 42 and the latter will selectively engage the switch 100.

After having described the above construction, the operation of the present embodiment will be described.

As will become apparent the only action required of an operator is to insert the optical card 12 into the slot 18. Because of the guide block 16 and the card support member 42 the card 12 can travel along path A, whereby its longitudinal axis 12b will be parallel to the path A and intersect with the rotational reference axis 24. Of course, the data tracks face downwardly during insertion otherwise the optical head assembly 30 could not read them.

Figure 9:
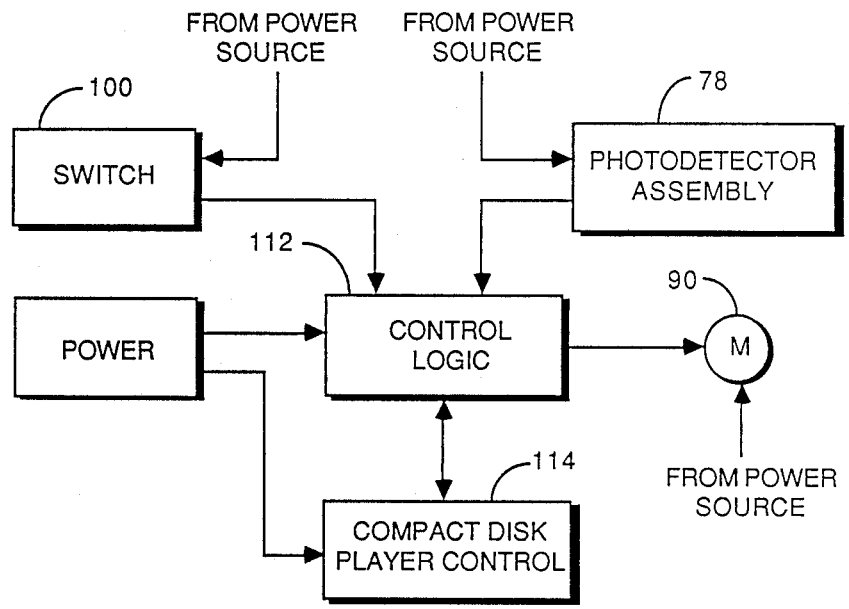
FIG. 9 is a block diagram of the control circuitry of the preferred embodiment.

The card receptacle 60 is properly oriented or aligned because, as noted, the detent surfaces 76a, 76b cooperate with respective ones of the edges 58a, 58b. As the card 12 enters the receptacle 60, it is sensed by the photodetector assembly 78 through the opening 72. The photodetector assembly 78 sends a signal to the logic circuitry 112 (FIG. 9). The logic circuitry 112 is responsive to the signal to cause the electric motor 90 to be energized and turn the drive pulley 88 in one direction. This will cause the drive wheel 82 to engage and drive the card 12 further into the card receptacle 60, whereby the internal walls 64 virtually properly position it. As the shaft 84 rotates, the driving gear 110 turns the driveng gear 106 through the idler gear 108. In turn, the cam member 96 rotates from the position shown in FIG. 3 to that of FIG. 4. As this occurs, the end of the cam member 96 contacts the card support member 42 and opposes the bias of the springs 44 to urge the latter downwardly. Concurrently, the leaf spring 62 is effective to force the card receptacle 60 downwardly, whereby the card 12 firmly engages the spindle 28. As this occurs the detents 76a, 76b disengage respectively the edges 58a, 58b. The centering post 28a will enter opening 13 to perfectly center the rotational axis of the data tracks on the card with the rotational reference axis 24. It will be appreciated that the card 12 and receptacle 60 can now rotate with the spindle 28 without any interference from the card support member 42. While this is happening, the switch actuator 98 is also turning. When the switch arm 98a contacts the switch 100, the latter is operative to signal, through the logic circuitry 112, the compact disc player 26. Consequently, the spindle 28 rotates and the optical head assembly 30 moves relative to the data tracks to commence a reading cycle. As a result of the spindle 28 rotating, the card 12 and the receptacle 60 rotate.

At the completion of a reading cycle, the compact disc player 26 will signal the logic circuitry 112 to cause the electric motor 90 to operate. However, in this mode, the motor 90 reverses its driving direction, whereby it rotates the drive wheel 82 in the opposite rotational direction. Since the shaft 84 is rotating it is effective to rotate the shaft 104. Rotation of the shaft 104 causes the cam member 96 to rotate back to the position shown in FIG. 3. As the cam member 96 returns to such position, the springs 44 are active to lift the card support member 42 upwardly, thereby lifting the card 12 off the spindle 28. Of course, the card receptacle 60 is lifted along with the leaf spring 62 back to the position shown in FIG. 3, whereby the card can be discharged through the slot 18 by the drive wheel 82. However before this occurs, the card receptacle 60 may be in any angular orientation following the reading cycle. The drive wheel 82 serves to facilitate proper orientation of the card receptacle 60 as can be appreciated from viewing FIG. 6. In this regard, the card receptacle 60 when returning to its up position will contact the rotating drive wheel 82. The drive wheel 82 causes the receptacle 60 to rotate until the detents 76a, b engage the respective edges 58a, b to orient and latch it in place.

Then when the driving wheel 82 engages the top of the card 12 through the card drive opening 74, the wheel discharges the card from the aligned receptacle 60 and partially out of the slot 18. At that point in time a user need merely withdraw the card 12 from the slot 18. Simultaneously, the switch actuator 98 rotates, in the direction opposite to the first direction, until the arm 98b contacts the switch 100, whereupon the latter signals the logic circuitry 112 to stop the electric motor 90. At that point in time the apparatus 10 ceases operation.

Reference is now made to FIGS. 10-15 to show an alternate embodiment of an optical card reader apparatus 210 of this invention. A housing assembly 214, guide block 216, and slot 218 are only shown partially in FIG. 11 since they are substantially like the structure of the previous embodiment. A compact disc player is shown in phantom and indicated generally by reference numeral 220. It is somewhat different from the previous embodiment because, among other things, it is a model D-5 made by the Sony Corporation of Japan. Moreover, the optical head assembly 222 moves in a linear path which is radial to a rotational reference axis 224.

A card positioning means 226 includes a card support assembly block 228 which is vertically displaceable by means of a rack and pinion arrangement 230 operated by a reversible electric motor 232. The motor 232 is energizable to selectively raise and lower the support block 228 between a card receiving position (FIG. 11) and a card rotating position (FIG. 12).

Figure 11:
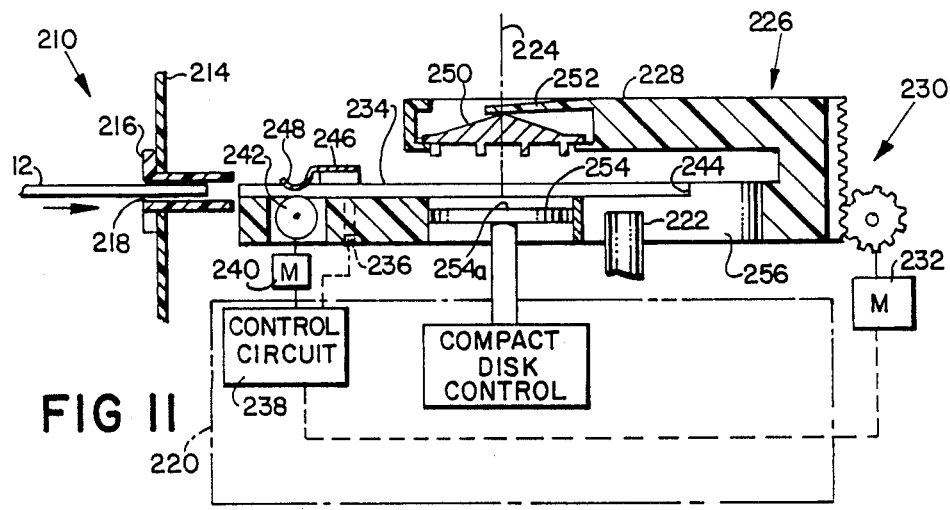
FIGS. 11 and 12 are diagrammatic views of the first alternate embodiment in different conditions of operation; and, FIGS. 13-15 show diagrammatically how in the first alternate embodiment, a biased card stop member operates to stop rotation of the card and orient the same.
Figure 12:
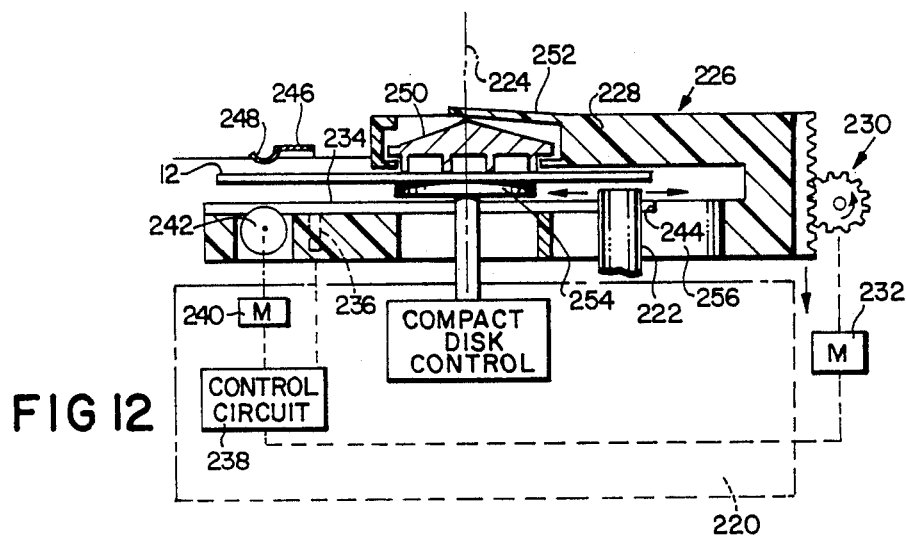

To initiate a reading cycle, a user inserts the card 12 through the slot 218 and into an aligned card receiving recess 234 formed in the support block 228 (FIG. 11). As in the previous embodiment, the card 12 has its data tracks facing downwardly. The card 12 will be pushed manually past a photodetector 236 which is like the one of the other embodiment and will sense the card and transmit a signal to a control circuit 238 which in turn energizes a reversible electric motor 240. The motor 240 is operative to rotate a drive roller 242 in a card insertion direction, whereby the card 12 is driven further into the recess 234 until it abuts stop wall 244. The stop wall 244 and the other walls defining defining the recess 234 are dimensioned to roughly center the tracks of the card 12 to the rotational reference axis 224.

The motor 240 is illustrated diagrammatically separate from the support block 228. However, it is to be understood that the motor 240 may be housed in the support block 228 and be mechanically coupled to the roller 242 which is mounted for rotation. The control circuit 238 has a time delay which will stop operation of the motor 240 after the card 12 has time to strike the stop wall 244. A card contact member 246 extends from a structure in the housing assembly 214 over the card recess 234. The card contact member 246 has a biasing finger 248 which contacts the top of the card 12 to urge the latter into firm engagement with the drive roller 242.

The control circuit 238, after a suitable time delay, effects operation of the motor 232 for causing the rack and pinion arrangement 230 to lower a support block 228. As a result, the floating card engaging member 250, which is biased by a molded leaf spring 252, contacts the top of the card 12 and biases the latter into driving engagement with the rotatable spindle 254 of the compact disc player. The leaf spring 252 will retain the card 12 in engagement with the spindle 254 during the card reading operation so that the longitudinal axis and plane of the card are substantially orthogonal to the rotational reference axis 224. The spindle 254 includes a centering post 254a whose axis is coincidental to that of the rotational reference axis 224. Thus, the centering post 254a will precisely align the rotational axis of the track on the card to the axis 224. During such operation, the optical head assembly 222 moves in an elongated slot 256 of the support block 228 and thereby travels radially with respect to the data tracks on the card 12.

Figure 10:
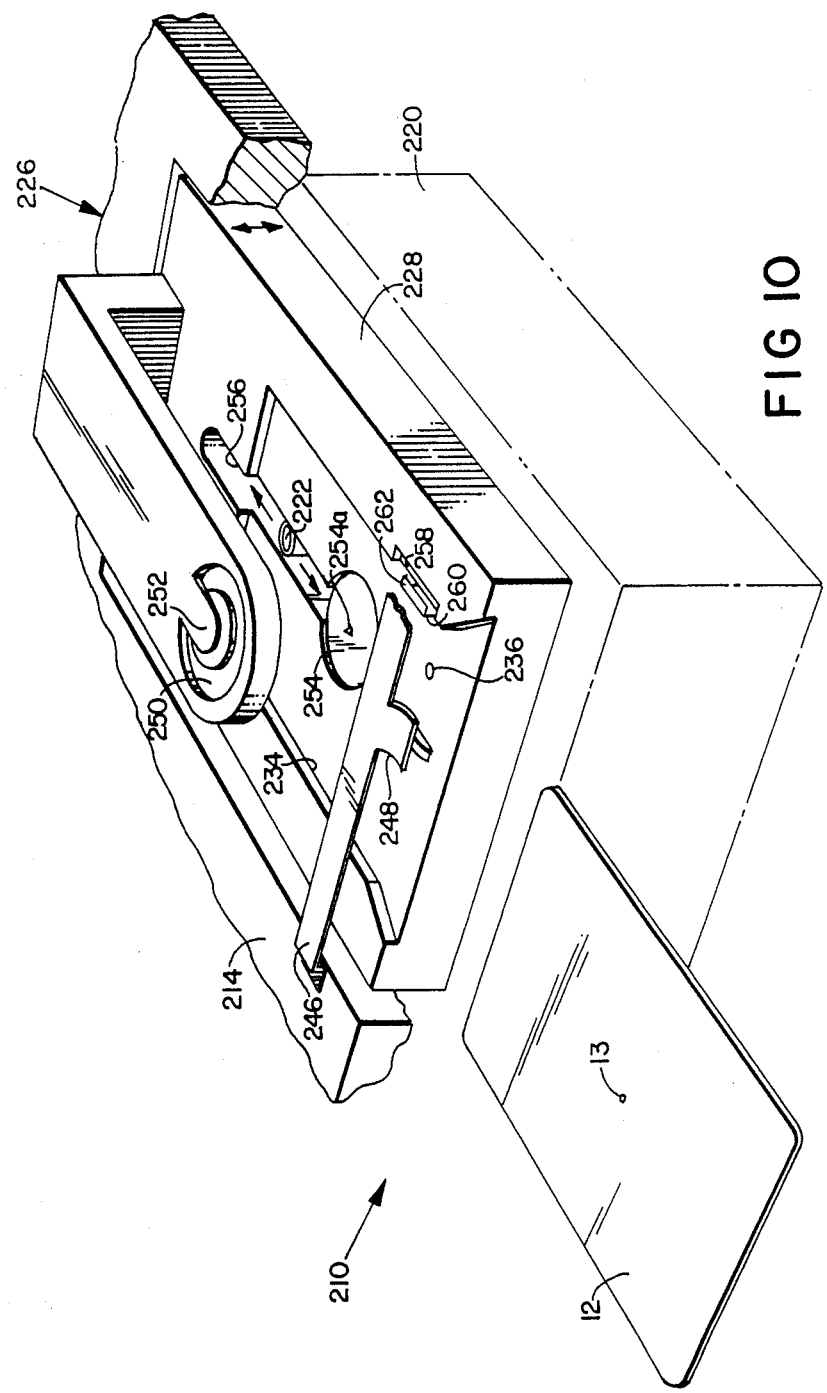
FIG. 10 is a diagrammatic perspective view of a first alternate embodiment of the present invention.
Figure 13:
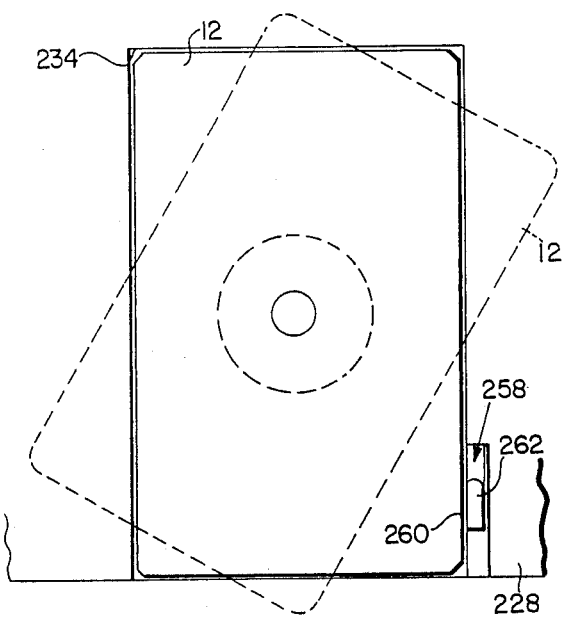
Figure 14:
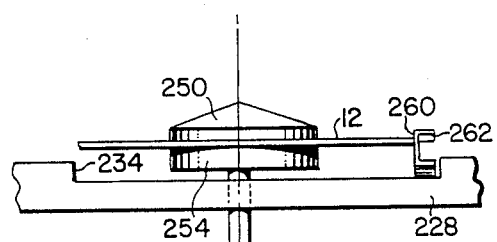
Figure 15A:
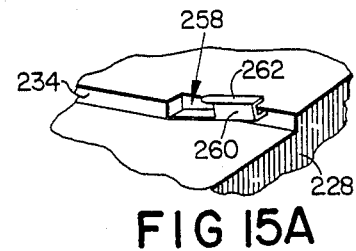
FIG. 15A is an enlarged fragmented perspective view of the biased card stop member.
Figure 15:
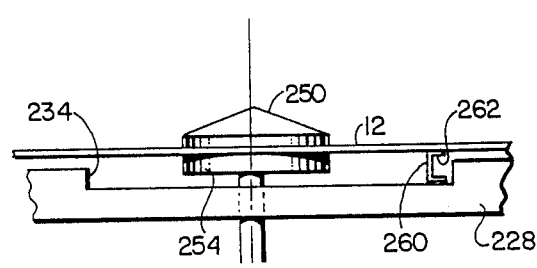

At the completion of the card reading operation, the compact disc player 220 will effect operation of the control circuit 238 to cause the motor 232 to operate the rack and pinion arrangement 230 to thereby raise the card support block 228. As the support block 228 moves upwardly, a card stopping and orienting means engages the card 12 to stop rotation of the latter and orient the same so that it can fall within the card recess 234. In this embodiment, the card stopping and orienting means includes a spring loaded card stop member 258 which in this embodiment is a cantilevered biased leaf spring attached at one end to the support block 228 and is adjacent the card recess 234, as illustrated in FIG. 10. At the distal end of the spring loaded card stop member 258 are a sidewall 260 and a flat wall 262. The spring loaded card stop member 258 may intersect the plane of card rotation (FIG. 13). If the edge of the rotating card 12 hits the sidewall 260, the card will continue to rotate until it is aligned with the recess 234, whereby the card will be received therein as the support block 228 moves upwardly under the influence of the rack and pinion arrangement 230. If the spring loaded card stop member 258 cross the plane of rotation of the card 12 while the card is in its path, the cantilevered spring loaded member 258 will lower because the downward force of the leaf spring 252 is greater than the upward force of the biased card stop member 258. This permits the card 12 to ride over the flat wall 262. During the next half rotation of the card, it will engage the sidwall 260, to thereby cause the card to stop rotating while simultaneously orienting it with the recess 234.

The control circuit 238 is effective, after a time delay, to deenergize the electric motor 232 and energize the motor 240 so that the latter rotates in the opposite or discharge direction. Accordingly, the card 12 will be discharged from the support block 228 and into the slot 218, whereby an operator may manually pull the card from the optical reader apparatus 210.

Figure 16:
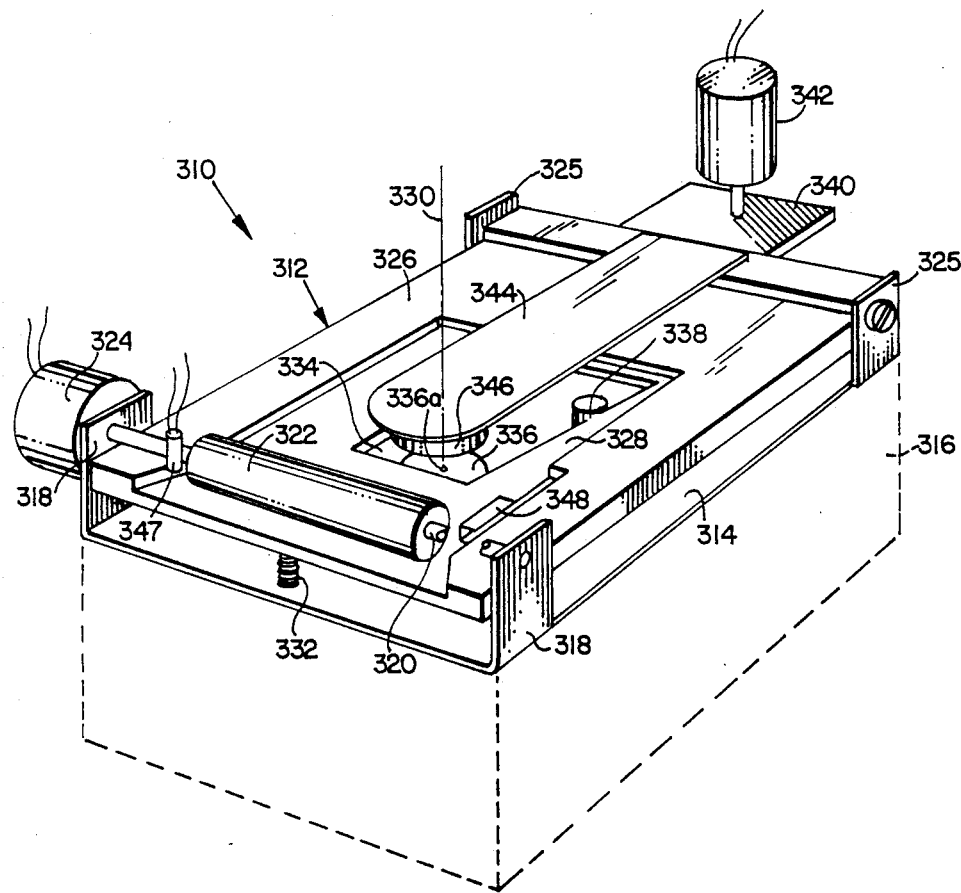
FIG. 16 is a diagrammatic view of a second alternate embodiment of the present invention.

Reference is now made to FIG. 16 which shows, in diagrammatic form, an alternative embodiment of an optical card reader apparatus 310 of this invention. This embodiment, as with the last, has structure omitted for clarity of description. Therefore, it will be understood that this embodiment includes a housing assembly (not shown) which is provided with a guide block (not shown) defining a card entry/exit slot (not shown). The entry/exit slot is situated so that an optical card (not shown) can be manually inserted through the guide block slot and into operative engagement with a card positioning means 312.

The positioning means 312 includes an adapter plate 314 which is suitably connected to a compact disc player 316 of the kind described in the first embodiment. Adjacent one end of the adapter plate 314 is a pair of support arms 318 which rotatably support ends of drive shaft 320. A card drive roller 322 fixed to the shaft 320 is positioned normally so that it can drivingly engage the top surface of the card which is not shown but which is like the kind illustrated in FIG. 8. The card drive roller 322 is driven through the shaft 320 in either direction by a reversible motor 324 attached to one of the support arms 318. At the opposite end of the adapter plate 314 are a pair of support arms 325 which pivotally support a card support member 326. The card supporting member 326 has a card receiving and aligning recess 328 aligned with the slot for receiving and positioning the rotational center of the data tracks of the card with respect to a rotational reference axis 330. The card support member 326 is normally biased to the position shown in FIG. 16 by a biasing spring 332 interposed between the adapter plate 314 and the card support member 326. The card support member 326 has an opening 334 which allows operative communication between the card and the spindle 336 and the optical head assembly 338. The pivotal card support member 326 has a rearward tab portion 340 which is directly coupled to an electromagnetic actuator which, in this embodiment, is a solenoid 342. The solenoid 342, when energized, pulls the tab 340 upwardly, thereby causing the other end of the card support member 326 to pivot downwardly and overcome the bias of the spring 332. A leaf spring member 344 is mounted to the card support member 326 and has a card engaging member 346 for firmly pressing the card onto spindle 336 when the card support member 326 moves downwardly as will be explained. A centering post 336a on the spindle 336 will be urged into a central card opening 13 (FIG. 8) so as to precisely position the tracks with respect to a rotational reference axis 330. Thereafter, the compact disc player 316 will operate to have the optical head assembly 338 read the data tracks.

To commence a reading operation the card is inserted manually into the slot, a photodetector 347 of the kind described in the first embodiment senses the cards presence and sends a signal to a control circuit (not shown) which is similar to the control circuit of the last noted embodiment. This control circuit is effective to energize the motor 324 to rotate the drive roller 322 in a direction which thereby drives the card into the card recess 328. The card will strike the walls of the recess 328 and such walls are effective to substantially center the data tracks with the rotational reference axis 330. The drive roll 322 will rotatably slip over the card when the latter is in the recess 328. Once the photodetector 348 no longer senses the card, it transmits a signal to the control circuit which, in turn, effectively energizes the solenoid 342 to pull up the tab 340. Thus, the other end of the card support member 326 and card move downwardly whereby the card is urged by the leaf spring 344 into firm driving engagement with the spindle 326 so that the longitudinal axis and plane of the card are substantially orthogonal to the axis 330. The centering post 326a fits into the card opening for precise centering of the card relative to the reference axis 330.

After a suitable time delay, the disc player 316 operates to rotate the spindle 336 and allow the optical head assembly 338 to move relative to the data tracks on the card for a card reading cycle. It will be understood that the card support member 326 is below the plane of rotation of the card.

At the completion of the reading cycle the compact disc player 316 through the control circuit deenergizes the solenoid 342, whereby the biasing spring 332 forces the tab 340 downwardly. This, of course, raises the other end of the card support member 326. As the card support member 326 is lifted it will engage a spring loaded card stop member 348. This card stop member 348 is structurally and functionally like that of the previous embodiment. The spring loaded card stop member 348 stops rotation of the card and orients the latter with the recess 328. Thus, as the card support member 326 is raised, the card will fit in the recess 328. After a suitable time delay the control circuit, in response to the end of the reading cycle of the compact disc player 316, operates the motor 324 to rotate the drive roller 322 in the opposite direction. This effectively discharges the card from the recess 328 along a path which leads to the entry/exit slot. Termination of the motor operation ceases operation of the optical card reader 310.

In the present invention, the card can utilize other storage media besides optical storage media. For example, it can use magnetic media or photosensitive media. The present invention also contemplates that a separate card rotating device can rotate the card instead of the card reader device. Although the card travels along the same path for entry and discharge, it will be appreciated that the entry and exit slot need not be the same.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for transferring a generally rectangular card having thereon binary coded information, in concentric and/or spiral tracks, along a predetermined path to a rotational reference axis whereat the card is rotated thereabout, said apparatus comprising:
   a housing assembly including an opening thereinto;
   a binary coded information reader and/or writer device disposed in said housing assembly;
   means disposed in said housing assembly for transferring the card from said opening to the reference axis; and
   means for positioning the card at the reference axis and for cooperating with said transferring means so that a longitudinal axis of the card is substantially parallel to said path during transfer of the card along at last a portion of said path and for allowing rotation of the card about the reference axis, whereby the tracks can be read and/or written by said reader and/or writer device.

2. The apparatus of claim 1 wherein: said positioning means allows the card to be rotatably driven by said reader and/or writer device.

3. The apparatus of claim 2 wherein: said housing assembly includes means for guiding the card along said predetermined path from said opening so that the longitudinal axis of the card is substantially parallel to said path.

4. The apparatus of claim 3 wherein: said transferring means includes means for sensing the presence of the card along said path and in response thereto for producing a signal indicative of the presence of the card; and, card driving means responsive to said signal for driving the card in a first direction along said path to operative cooperation with said positioning means.

5. The apparatus of claim 4 wherein: said positioning means includes a card receptacle disposed for rotation about the reference axis and orientable in a preferred position along said path to removably receive therein the card from said driving means, said receptable being constructed to allow the card contained therein to be rotated by said reader and/or writer device; means for orienting and latching said card receptacle in said preferred position.

6. The apparatus of claim 5 further including:
   first biasing means for providing a biasing force; a card support member movable between first and second positions and being normally biased by said first biasing means to said first position, wherein when in said first position said orienting and latching means orients and latches said card receptacle in said preferred position and when in said second position said orienting and latching means allows rotation of said receptacle and the card; and, means operable for moving said card support member to said second position when in a first condition of operation, and for allowing said biasing means to move said card support member back to said first position when in a second condition of operation.

7. The apparatus of claim 6 wherein: said positioning means includes a second biasing means for biasing said card receptacle and the card held therein toward a spindle on said reader and/or writer device, whereby the card engages said spindle such that the longitudinal axis of the card is orthogonal to the reference axis and so that said receptacle and the card can be rotatably driven about the reference axis.

8. The apparatus of claim 7 wherein: said card driving means rotatably drives said receptacle and the card to said preferred position when said card support member is moved from said second position back to said first position, whereby said orienting and latching means orients and latches said card receptacle in said preferred position.

9. The apparatus of claim 8 wherein: said card driving means engages the card and drives it out of said receptacle in a second direction opposite said first direction, when said receptacle is in said preferred position.

10. The apparatus of claim 6 wherein: said means for moving said card support member includes camming means which, when said moving means is in said first condition, engages said card support member to thereby overcome the biasing force of said first biasing means and move said card support member to said second position and allows said second biasing means to urge said receptacle and the card into a position where the card engages said spindle, and when said moving means is in said second condition said camming means is disengaged from said card support member and allows said first biasing means to urge said card support member back to said first position, whereby said card support member can engage the card during movement to said first position and cause disengagement of the card from said spindle.

11. The apparatus of claim 10 wherein: said orienting means includes a pair of detent members each one being arranged relative to the other and said card support member so as to orient said card receptacle in said preferred position and to prevent rotation of said card receptacle from said preferred position when said card support member is in said first position.

12. The apparatus of claim 2 wherein: said positioning means includes a centering post on said spindle which cooperates with a centering hole on the card to properly position the card with respect to the reference axis.

13. The apparatus of claim 2 further including adjustable means for properly adjusting the position of said card receptacle and the card with respect to the rotational reference axis.

14. The apparatus of claim 2 wherein: said reader and/or writer device is an optical reader and/or writer device.

15. The apparatus of claim 4 wherein: said positioning means includes a card support assembly movable between first and second positions, such that when in said first position the card is removably received therein from said card driving means and when in said second position the card is precisely positioned at the reference axis so that the longitudinal axis of the card is orthogonal to the reference axis and so that the card engages and is rotated by a spindle of said reader and/or writer device free from said card support assembly; and means for moving said card support assembly between said first and second positions.

16. The apparatus of claim 15 wherein said card support assembly includes means for stopping rotation of the card and for orienting the card in a preferred position relative to said path as said card support assembly moves to said first position from said second position.

17. The apparatus of claim 16 wherein said card support assembly is mounted for pivotal movement and said means for moving includes first means for continuously biasing said card support assembly to said first position and electromagnetic means energizable for moving said card support assembly to said second position against the bias of said first biasing means.

18. The apparatus of claim 16 wherein said means for moving said card support assembly includes a rack and pinion arrangement operatively connected to said card support assembly.

19. Apparatus adapted to be connected to a binary coded information reader and/or writer device such that a generally rectangular card having thereon binary coded information in substantially concentric and/or spiral tracks is transferred along a predetermined path to a rotational reference axis defined by a spindle of the device whereat the card is rotated, said apparatus comprising:
a housing assembly including an opening thereinto;
means disposed in said housing assembly for transferring the card from said opening to the reference axis; and
means for positioning the card at the reference axis and for cooperating with said transferring means so that a longitudinal axis of the card is substantially parallel to said path during transfer of the card along at least a portion of said path and for allowing rotation of the card about the reference axis, whereby the tracks can be read and/or written by the reader and/or writer device.

20. The apparatus of claim 19 wherein said positioning means allows the card to be rotatably driven by the reader and/or writer device.

21. The apparatus of claim 20 wherein said housing assembly includes means for guiding the card along said predetermined path from said opening so that the longitudinal axis of the card is substantially parallel to said path.

22. The apparatus of claim 21 wherein said transferring means includes means for sensing the presence of the card along said path and in response thereto for producing a signal indicative of the presence of the card; and, card driving means responsive to said signal for driving the card in a first direction along said path to operative cooperation with said positioning means.

23. The apparatus of claim 22 wherein said positioning means includes a rotatable card receptacle rotatable about the reference axis and which is orientable in a preferred position along said path to removaly receive therein the card from said card driving means, said receptacle being constructed to allow the card contained therein to be rotated by the reader and/or writer device; means for orienting and latching said card receptacle in said preferred position.

24. The apparatus of claim 23 further including:
first biasing means for providing a biasing force; a card support member movable between first and second positions and being normally biased by said first biasing means to said first position, wherein when in said first position said orienting and latching means orients and latches said card receptacle in said preferred position and when in said second position said orienting and latching means allows rotation of said receptacle and the card; and, means operable for moving said card support member to said second position when in a first condition of operation, and for allowing said biasing means to move said card support member back to said first position when in a second condition of operation.

25. The apparatus of claim 24 wherein said positioning means includes a second biasing means for biasing said card receptacle and the card held therein toward the spindle on the reader and/or writer device, whereby the card engages the spindle such that the longitudinal axis of the card is orthogonal to the reference axis and so that said receptacle and the card can be rotatably driven about the reference axis.

26. The apparatus of claim 25 wherein said card driving means rotatably drives said receptacle and the card to said preferred position when said card support member is moved from said second position back to said first position, whereby said orienting and latching means orients and latches said card receptacle in said preferred position.

27. The apparatus of claim 26 wherein said card driving means engages the card and drives it out of said receptacle in a second direction opposite said first direction, when said receptacle is in said preferred position.

28. The apparatus of claim 24 wherein said means for moving said card support member includes camming means, which when said moving means is in said first condition engages said card support member to thereby overcome the biasing force of said first biasing means and move said card support member to said second position and allow said second biasing to urge said receptacle and the card into a position where the card engages the spindle, and when said moving means is in said second condition said camming means is disengaged from said card support member and allows said first biasing means to urge said card support member back to said movement to said first position, whereby said card support member can engage the card during movement to said first position and cause disengagement of the card from the spindle.

29. The apparatus of claim 28 wherein said detent means includes a pair of detent members each one being arranged relative to the other and said card support member so as to orient said card receptacle in said preferred position and to prevent rotation of said card receptacle from said preferred position when said card support member is in said first position.

30. The apparatus of claim 20 wherein said positioning means includes a centering post on the spindle which cooperates with a centering hold on the card to properly position the card with respect to the reference axis.

31. The apparatus of claim 20 further including adjustable means for properly adjusting the position of said receptacle and the card with respect to the rotational reference axis.

32. The apparatus of claim 20 wherein the reader and/or writer device is an optical reader and/or writer device.

33. The apparatus of claim 22 wherein said positioning means includes a card support assembly movable between first and second positions, such that when in said first position the card is removably received therein from said card driving means and when in said second position the card is precisely positioned at the reference axis so that the longitudinal axis of the card is orthogonal to the reference axis and so that the card engages and is rotated by a spindle of the reader and/or writer device free from said card support assembly; and means for moving said card support assembly between said first and second positions.

34. The apparatus of claim 33 wherein said card support assembly includes means for stopping rotation of the card and for orienting the card in a preferred position relative to said path as said card support assembly moves to said first position from said second position.

35. The apparatus of claim 34 wherein said card support assembly is mounted for pivotal movement and said means for moving includes first means for continuously biasing said card support assembly to said position and electromagnetic means energizable for moving said card support assembly to said second position against the bias of said first biasing means.

36. The apparatus of claim 34 wherein said means for moving said card support assembly includes a rack and pinion arrangement operatively connected to said card support assembly.

37. A method of transferring a generally rectangular card having thereon binary coded information in substantially concentric and/or spiral tracks to a rotational reference axis whereat the card can be rotated thereabouts so that the tracks can be read and/or written on by a reader/writer device, said method comprising the steps of:
   automatically transferring the card to the reference axis; and automatically positioning the card at the reference axis by driving means in such a manner that the card can be rotated thereabout,
   said transferring step includes transferring the card to the reference axis along a predetermined path which is generally parallel to a longitudinal axis of the card as it travels along at least a portion of the path.

38. The method of claim 37 wherein said positioning step includes positioning the card in such a manner that the card can be rotated by a spindle of the reader and/or writer device.

39. The method of claim 38 wherein said positioning step includes precisely positioning a rotational axis of the tracks on the card coincidental to the rotational reference axis.

40. The method of claim 39 wherein said positioning step includes positioning the card so that the plane of the rotating card is substantially orthogonal to the rotational reference axis.

41. The method of claim 40 further including the steps of: orienting the card in a preferred position by stopping rotation of the card and disengaging the card from the spindle.

42. The method of claim 37 wherein the reader and/or writer device is an optical reader and/or writer device and the card has an optically encoded and/or writable medium.

* * * * *